United States Patent [19]

Asaba et al.

[11] 4,327,275
[45] Apr. 27, 1982

[54] LASER WELDING OF AN ELECTRON GUN

[75] Inventors: Shuuji Asaba, Fujisawa; Minoru Nemoto, Yokohama; Kenji Ushimi, Sagamihara; Akira Ono, Tokyo, all of Japan

[73] Assignee: Tokyo Shibaura Denki Kabushiki Kaisha, Kawasaki, Japan

[21] Appl. No.: 93,138

[22] Filed: Nov. 9, 1979

[30] Foreign Application Priority Data

Nov. 14, 1978 [JP] Japan ................. 53-139339

[51] Int. Cl.³ .......................................... B23K 26/04
[52] U.S. Cl. ..................... 219/121 LD; 219/121 LS; 219/121 LX; 219/121 LY; 219/121 LC; 219/121 LT
[58] Field of Search ...... 219/121 L, 121 LC, 121 LD, 219/121 LM, 121 LS, 121 LT, 121 LX, 124.34, 121 LY

[56] References Cited

U.S. PATENT DOCUMENTS

| | | | |
|---|---|---|---|
| 3,766,355 | 10/1973 | Kottkamp | 219/124.34 X |
| 3,902,036 | 8/1975 | Zaleckas | 219/121 LX X |
| 3,943,324 | 3/1976 | Haggerty | 219/121 LT X |
| 4,012,213 | 3/1977 | Haggerty et al. | 219/121 LT X |
| 4,088,890 | 5/1978 | Waters | 219/121 LC X |
| 4,125,755 | 11/1978 | Plamquist | 219/121 LD |

FOREIGN PATENT DOCUMENTS 697788 11/1964 Canada ................. 219/124.34

OTHER PUBLICATIONS

*Laser Focus;* vol. 12, No. 3, pp. 33–36, Mar. 1976; "Automated Welding of Minute Parts" by Aeschlimann et al.

*Primary Examiner*—J. V. Truhe
*Assistant Examiner*—Keith E. George
*Attorney, Agent, or Firm*—Cushman, Darby & Cushman

[57] ABSTRACT

A method of assembling an electron gun, which method permits welding of a number of welding points to be effected simply, in a short period of time and without causing mechanical distortion in welded parts and comprises the steps of; causing relative movement of electron gun parts to be welded together and the axes of a laser beam for welding and a light beam for positioning a welding point, these axes being in a predetermined positional relation to each other; causing the light beam for positioning to be incident on a part to be welded; detecting reflected light obtained when the light beam for positioning is reflected by a portion of the aforementioned part to be welded corresponding to a welding point; stopping the aforementioned relative movement according to the detection of the aforementioned reflected light; and exposing the aforementioned welding point to the laser beam for welding according to the detection of the reflected light so as to effect welding of parts to each other.

7 Claims, 10 Drawing Figures

F I G. 8
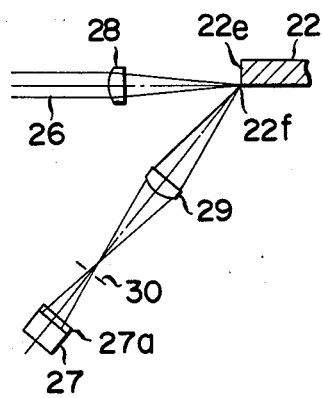
F I G. 9
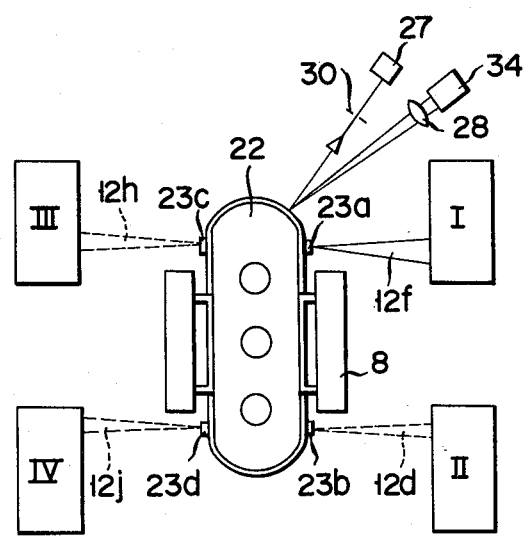

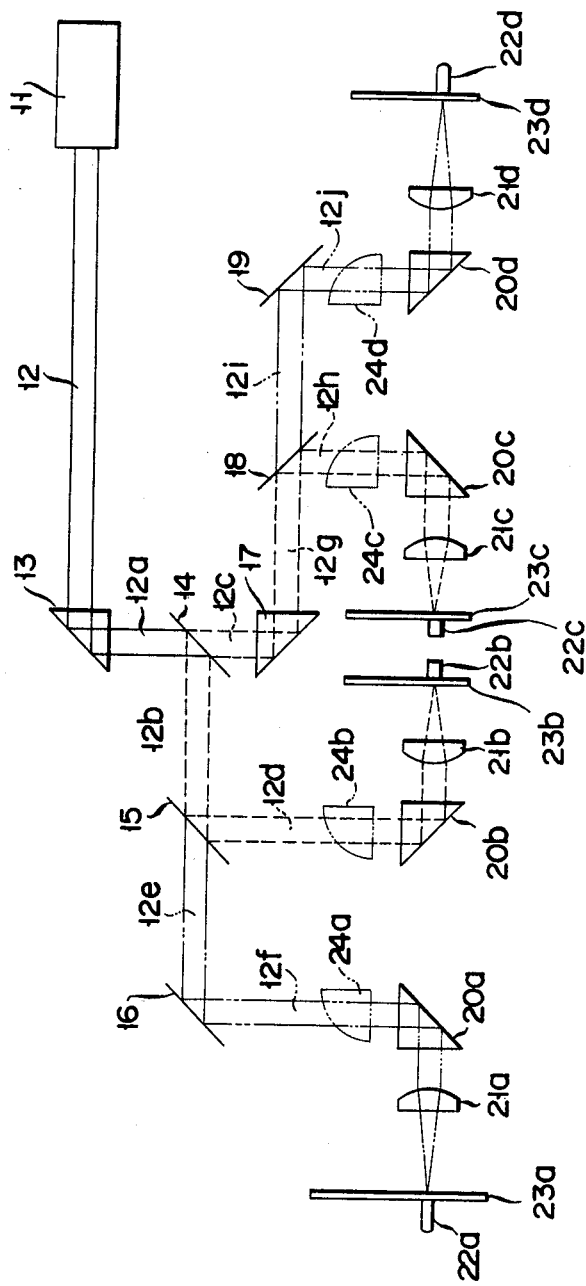

LASER WELDING OF AN ELECTRON GUN

BACKGROUND OF THE INVENTION

This invention relates to a method of assembling electron guns for cathode-ray tubes and, more particularly, to a method of assembling an electron gun comprising a step of accurately welding strap conductors to predetermined positions of an electron gun having a number of electrodes by using a laser beam.

Usually, with an electron gun for a cathode-ray tube, which has a comparatively simple electrode construction, for instance an ordinary bi-potential type electron gun having first to fourth grids, voltages are applied to the first to fourth grids through strap conductors. The connection of grid and strap conductor in this case is made by clamping the strap conductor in a lug provided on the grid and welding it by resistance welding.

However, at the time of the resistance welding of the grid and strap conductor to each other, splash takes place, and metal powder is attached to the grid surface to deteriorate the breakdown characteristics of the electron gun. In addition, deformation of the grid is liable to be caused by pressure application at the time of welding. Further, the effective diameter of the electron gun is reduced by the presence of the lug which is provided on the grid for the purpose of welding.

The aforementioned disadvantages in the case of adopting the resistance welding are particularly pronounced when assembling an electron gun having a complicated electrode construction having many positions where strap conductors are welded, as shown in FIGS. 1 to 3.

The electron gun shown in FIGS. 1 to 3 comprises a cathode 1 containing a heater (not shown), a first grid 2, a second grid 3, a third grid 4, a fourth grid 5, a fifth grid 6, a sixth grid 7 and a convergence electrode (not shown). The first grid 2 is a cup-shaped electrode, the second grid 3 is a plate electrode, the third electrode 4 consists of two cup-shaped electrodes 4a and 4b, the fourth grid 5 consists of three plate electrodes 5a, 5b and 5c, the fifth grid 6 consists of four electrodes, namely a cup-shaped electrode 6a, a plate electrode 6b and two cup-shaped electrodes 6c and 6d stacked in the mentioned order, and the sixth grid 7 consists of two cup-shaped electrodes 7a and 7b. The cathode 1 and first to sixth grids 2 to 7 are supported at predetermined spacings by insulating support members 8 such as bead glass. Reference numeral 9 designates a support plate for supporting the heater and securing the electron gun on the stem.

With the electron gun of the above construction, a voltage of about 25 KV is applied through a strap conductor R-1, a convergence electrode (not shown) and a bulb spacer (not shown) to the sixth grid 7, a voltage of about 7 KV through a strap conductor R-2 to the fifth and third grids 6 and 4, a voltage of several hundred volts through a strap conductor R-3 to the fourth and second grids 5 and 3, and earth voltage through a strap conductor R-4 to the first grid 2.

With the above electron gun having a complicated electrode construction, the number of strap conductors electrically connecting grids is greater than the case of the electron gun having a simpler electrode construction, and hence there are a greater number of points of connection of these strap conductors to the grids; namely the strap conductor R-1 has two junctures on the cup-shaped electrodes 7a and 7b, the strap conductor R-2 has a total of six junctures, four on the cup-shaped electrodes 6a, 6c and 6d and the plate electrode 6b and two on the cup-shaped electrodes 4a and 4b, the strap conductor R-3 has a total of four junctures, three on the plate electrodes 5a, 5b and 5c and one on the second grid 3, and the strap conductor R-4 has one juncture on the first grid 2. Connecting the individual strap conductors to a number of peripheral edge portions of the electrodes as mentioned above by resistance welding involves technical difficulties and requires much time if it could be made. Therefore, the conventional welding method does not only require high cost but also imposes restrictions upon the quantity of production.

SUMMARY OF THE INVENTION

An object of the invention is to provide a method of assembling an electron gun, with which method strap conductors can be welded at a number of positions in the assembly of an electron gun simply, in a short period of time and without causing mechanical distortion of the welded parts, and also which can automate the assembly.

The invention features a method of assembling an electron gun comprising the steps of; causing relative movement of electron gun parts to be welded together and the axes of a laser beam for welding and a light beam for positioning, these axes being in a predetermined positional relation to each other; causing the light beam for positioning to be incident on a part to be welded; detecting reflected light obtained when the light beam for positioning is reflected by a portion of the aforementioned part to be welded corresponding to a welding point; stopping the aforementioned relative movement according to the detection of the aforementioned reflected light; and exposing the aforementioned welding point to the laser beam for welding according to the direction of the reflected light so as to effect welding of parts to each other.

BRIEF DESCRIPTION OF THE DRAWINGS

FIGS. 6 to 8 are views illustrating the positioning of welding point;

FIG. 9 is a plan view of a set-up for assembling an electron gun by using four apparatus shown in FIG. 4; and FIG. 10 is a view showing an optical system for producing four laser beams from a laser beam produced from a laser beam generator.

DETAILED DESCRIPTION OF THE PREFERRED EMBODIMENTS

An embodiment of the method of assembling an electron gun and an apparatus for carrying out the method will now be described with reference to FIG. 4.

Figure 1:
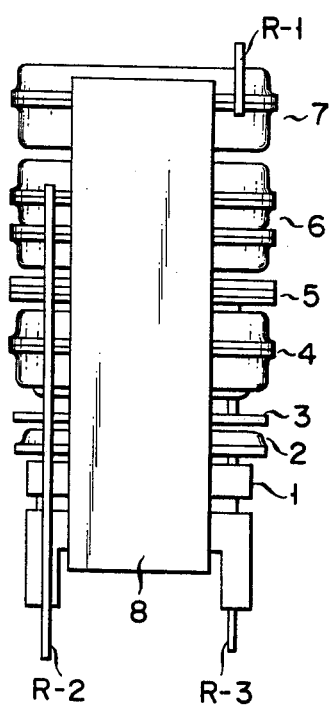
FIG. 1 is a front view of an electron gun having a complicated electrode construction.
Figure 2:
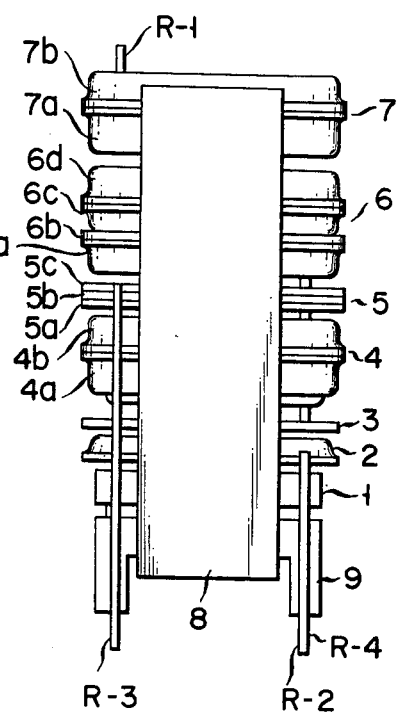
FIG. 2 is a back view of the electron gun shown in FIG. 1.
Figure 3:
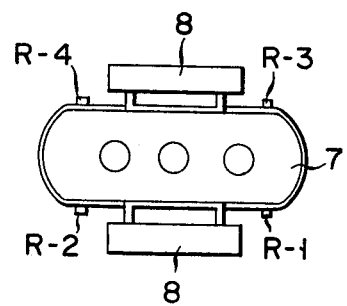
FIG. 3 is a top view of the electron gun shown in FIG. 1.

A semi-fabricated product (bead mount) 10 for the eventual electron gun, which has the electrode structure shown in FIGS. 1 to 3 except for that the strap conductors R-1, R-2, R-3 and R-4 are not provided, is placed on a turntable (not shown) and then moved to a predetermined position. Then, a strap conductor 23a is paid off from a spool (not shown) and supplied to a predetermined position relative to the bead mount 10. At this time, a laser beam 26 is shot from a laser beam generator 34 for positioning, reflected by a mirror 35 and a mirror 36 mounted on a table 33 and transmitted through a lens 28 also mounted on the table 33 to be incident on, for instance, a portion 2b of the first grid 2 corresponding to a welding portion 22a. At this time, the table 33 is being vertically moved by the action of a stepping motor 38 via a ball screw 37. The reflected light of the laser beam 26 is transmitted through a lens 29 to be incident on a sensing cell 27, and the corresponding signal that is produced from the sensing cell 27 is amplified by an amplifier 39 and coupled to a computer 40 for processing and operation thereon. The resultant output from the computer 40 is supplied to a stepping motor controller 41. The stepping motor controller 41 stops the stepping motor 38 to stop the vertical movement of the table 33 when the output voltage of the sensing cell 27 becomes a predetermined threshold voltage, that is, when the laser beam 26 is properly incident on the peripheral edge portion 2b of the first grid 2 corresponding to the welding portion 22a thereof. Then, a laser beam 12f for welding is led by an open shield plate 24a, a prism 20a and a lens 21a mounted on the table 33 to be incident on the welding portion 22a of the first grid 22, whereby the first grid 22 and strap conductor 23a are welded together.

Additionally, for the purpose of horizontally spreading the laser beam 26 to obtain a wide flux of laser beam thereby to prevent the occurrence of detection errors due to the irregularities of the edge portion 2b, the invention enables a cylindrical lens to be provided between the laser beam generator 34 and the electrodes to be welded. Further, for the purpose of preventing the occurrence of detection errors due to, for example, dirts or soils of the mirror, the invention enables the transmission of laser beam by using an optical fiber in place of the mirrors 35, 36.

The operation of the apparatus shown in FIG. 4 will now be described in further detail. The table 33 is gradually raised from below the welding portion 22a. During this time, the laser beam 26 for positioning may be reflected by edge portions of other grids and enter the sensing cell 27, but the resultant signal from the sensing cell 27 is discriminated to be a signal from the right welding position through treatment by the computer 40. Thus, neither a signal for stopping the operation of the stepping motor nor a signal for opening the shield plate 24a is supplied to the stepping motor controller 41. When the table 33 reaches the right position corresponding to the welding portion of the first grid 22, the computer 40 delivers a stop signal to the stepping motor controller 41 to stop the stepping motor, while causing rotation of the shield plate 24a up to a position of broken line so that it can permit the laser beam for welding.

Similarly, the strap conductor 23a can be successively welded to other grids. Further, welding of another strap conductor and grids can be similarly carried out, for instance, by rotating the bead mount.

When welding at all the preset welding portions is completed, the stepping motor 38 is operated to lower the table 33 to a position corresponding to the bottom of the bead mount 10, then the completed electron gun is removed, and the next bead mount is brought into position.

Figure 4:
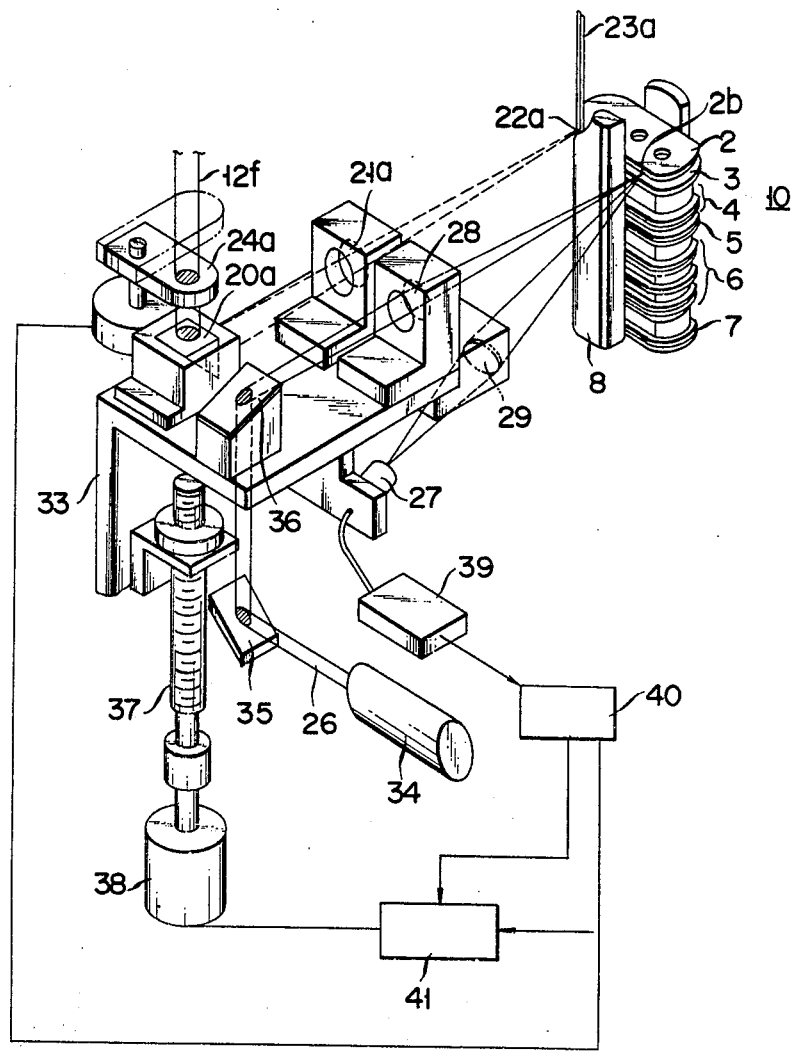
FIG. 4 is a perspective view showing an example of the apparatus used for carrying out the method according to the invention.

While in the apparatus shown in FIG. 4 the shield plate 24a is mounted on the table 33, this need not be so, and the shield plate may be disposed at any position, at which it can shield the laser beam 12f for welding. Further, in some cases, this shield plate 24a may be omitted. Furthermore, the laser beam 26 used for positioning the welding point may be replaced with ordinary visible light.

Figure 5:
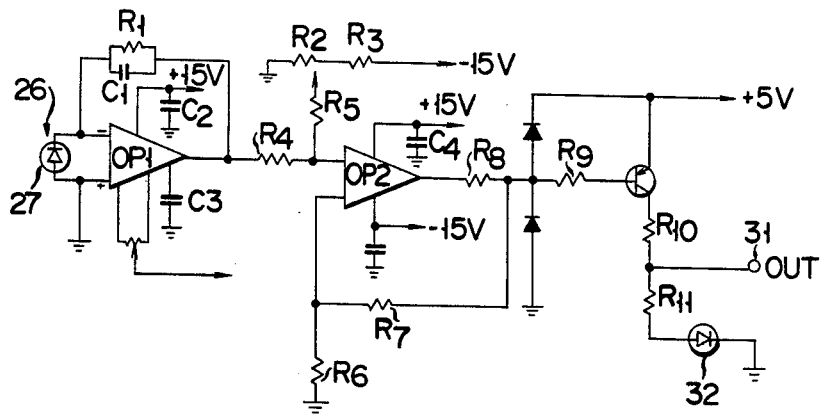
FIG. 5 is a circuit diagram of an amplifier used for the apparatus shown in FIG. 4.

FIG. 5 is a circuit diagram of the sensing cell 27 and amplifier 39 in FIG. 4. In the circuit shown in FIG. 5, a photoelectric switch is used as the sensing cell 27, and an output signal of the photoelectric switch caused by the detection of the reflected laser beam from the welding point of the electron gun is amplified by IC amplifier OP1 and level-compared with threshold voltage in OP2 and finally a predetermined voltage signal is obtained at an output terminal 31. The circuit also uses an LED (light emitting diode) as display lamp for confirming the positioning.

In the circuit of FIG. 5, $R_1$ to $R_{11}$ are resistors of 10 M$\Omega$, 1 K$\Omega$, 220 $\Omega$, 47 K$\Omega$, 47 K$\Omega$, 100 $\Omega$, 100 $\Omega$, 1 K$\Omega$, 9.8 K$\Omega$, 220 $\Omega$ and 220 $\Omega$ respectively, $C_1$ to $C_4$ are capacitors of 10 pF, 0.1 $\mu$F, 0.1 $\mu$F and 0.1 $\mu$F respectively, and OP1 and OP2 are respectively TA7505M and TA7504M (trade names by Toshiba). In this circuit, the output voltage when the sensing cell was operated by applying voltages of the values as shown in FIG. 5 was 4 V.

Now the method of detecting the position of welding strap conductor and grid will be described with reference to FIGS. 6 to 8.

Figure 6:
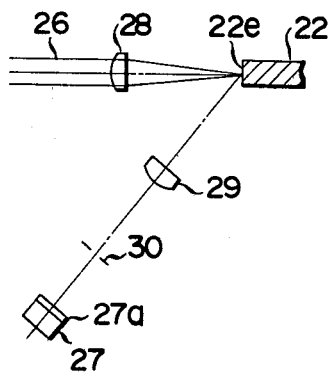
Figure 7:
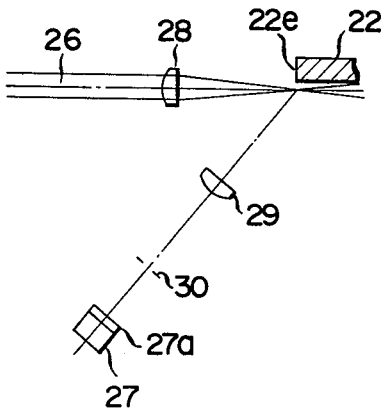

FIGS. 6 and 7 show the cases where the laser beam for positioning is incident on the other portion of the electrode than correct detecting point. In the example of FIG. 6, the laser beam 26 for positioning transmitted through the lens 28 and incident on the peripheral edge face 22e of the electrode 22 is reflected by the peripheral edge face 22e in the opposite direction. Thus, it is not transmitted through the lens 29 and a pin-hole 30 to be incident on the sensing cell 27, so that the positioning of the welding point is impossible. In the example of FIG. 7, the laser beam 26 is not incident on the peripheral edge face 22e of the electrode 22, so that like the case of FIG. 6 the positioning of the welding point is impossible.

For correctly detecting the welding position, the laser beam 26 incident on and reflected by the edge portion 22 has to be transmitted through the lens 29 and pin-hole 30 and detected by the sensing cell 27. At this time, for the detection of the welding point one-half the thickness of the electrode 22 is added to the detected value. The pin-hole 30 has a function of blocking laser having been reflected by other portions than the edge portion 22f so that it may not be incident on the sensing cell 27. In front of the sensing cell 27 a filter 27a selectively passing light of a particular wavelength, that is, the laser beam for positioning is provided.

In case of the electron gun as shown in FIGS. 1 to 3, which has four strap conductors, the welding of these four straps to the bead mount can be simultaneously carried out by using four apparatus of FIG. 4. FIG. 9 shows the arrangement of the four assembling apparatus I, II, III and IV. In this case, the amplifier, computer, stepping motor and controller can be commonly used.

The number of welding points of the strap conductors 23a, 23b, 23c and 23d with respect to the grids is shown in Table below. The diagram of FIG. 9 shows a state of making the welding of the strap conductor 23a (R-4) and first grid (G-1); thus, only the laser beam 12f is shown by solid lines, and the other laser beams 12d, 12h and 12j are shown by broken lines since they are blocked by the respective shield plates. The laser beams 12f, 12d, 12h and 12j are produced from a single laser beam from the same laser generator by a method to be described hereinafter. However, it is possible to use four laser generators of a suitable output as well.

TABLE

|  | Welding point number | | | | | | Total number |
| --- | --- | --- | --- | --- | --- | --- | --- |
|  | G-1 | G-2 | G-3 | G-4 | G-5 | G-6 |  |
| 23a (R-4) | 1 |  |  |  |  |  | 1 |
| 23b (R-3) |  | 1 |  | 3 |  |  | 4 |
| 23c (R-2) |  |  | 2 |  | 4 |  | 6 |
| 23d (R-1) |  |  |  |  |  | 2 | 2 |

It is seen from the Table that there are a total of 13 welding points, and these 13 weldings can be completed in a single sequence of operation by adopting the arrangement of apparatus as shown in FIG. 9.

Now the method of producing four laser beams from a laser beam from the same laser generator, as adopted for carrying out the welding with the arrangement of FIG. 9, will be described with reference to FIG. 10.

Referring to FIG. 10, a laser beam 12 shot from a laser generator 11 is bent 90° by a prism 13, and the resultant laser beam 12a is reflected by 50% and transmitted by 50% by a half mirror 14, so that a reflected laser beam 12b and a transmitted laser beam 12c are produced. This means that the laser beam 12 is divided by the half mirror 14 to produce two different laser beams. The reflected laser beam 12b is further divided by a half mirror 15, which effects 50% reflection to produce a laser beam 12b and 50% transmission to produce a laser beam 12e. Of these laser beams the laser beam 12e is bent 90° by a mirror 16 to produce a laser beam 12f. The laser beam 12c having been transmitted through the half mirror 14 is bent 90° by a prism 17 to produce a laser beam 12g, which is 50% reflected and 50% transmitted by a half mirror 18, thus producing a reflected laser beam 12h and a transmitted laser beam 12i, that is, the laser beam 12c is divided by the half mirror 18 to produce two different laser beams. The transmitted laser beam 12i is bent 90° by a mirror 19 to produce a laser beam 12j. Thus, the laser issuing from the laser generator 11 is divided in this stage into four laser beams 12f, 12d, 12h and 12j.

These division laser beams 12f, 12d, 12h and 12j are respectively bent 90° by prisms 20a, 20b, 20c and 20d and focused by focusing lenses 21a, 21b, 21c and 21d on portions of contact between the electrodes 22a, 22b, 22c and 22d and strap conductors 23a, 23b, 23c and 23d.

In this case, if the electrodes and strap conductors are not welded, the laser beams 12f, 12d, 12h and 12j are blocked by respective shutters 24a, 24b, 24c and 24d. For example, if the electrode 22c and strap conductor 23c are not to be welded to each other, the laser beam 12h is cut off with the shutter 24c.

As the laser generator 11 a YAG laser generator which produces a laser beam capable of welding even when divided into four beams is desirable.

As has been described in the foregoing, since the method according to the invention uses laser beam instead of the resistance welding for welding strap conductors and grids, there is no possibility of causing mechanical distortion in the grids, and an electron gun having excellent characteristics can be obtained. Further, even an electron gun having a complicated construction can be assembled in a very short period of time. Furthermore, since automation of the welding step is possible, it is possible to manufacture electron guns of high reliability at low manufacturing cost.

What we claim is:

1. A method for laser beam welding a strap conductor to an electrode of an electrode gun, the strap conductor for applying a voltage to a predetermined portion of the electrode, comprising the steps of:

disposing a strap conductor at a predetermined position along a surface of the electrodes to be laser beam welded to the electrodes;

providing a laser beam generator for generating, upon actuation, a laser beam for welding, the laser beam having a predetermined optical axis;

providing a positioning light source for generating a positioning light beam having an optical axis bearing a fixed predetermined relationship to the optical axis of the laser beam;

causing relative movement of the electrodes and strap conductor relative to the optical axes of the laser and positioning beams;

causing said positioning beam to be incident on an edge of the surface of the electrode, the positioning beam being at least partially reflected therefrom;

detecting reflected light obtained when said positioning light beam is reflected by the edge of the electrode from the point to be welded, light reflected from portions of the electrode other than the edge being stopped by a pin hole aperture;

stopping said relative movement in response to the detection of the reflected light; and actuating the laser beam generator so as to expose a welding point of the strap conductor to the laser beam for welding in response to the detection of said reflected light so as to effect welding of the electrode and strap conductor together.

2. The method according to claim 1, wherein welding at a plurality of welding points is successively effected repeating the afore-said steps a plurality of times.

3. The method according to claim 1, wherein welding of a plurality of electrodes and a plurality of strap conductors is effected by using a plurality of laser beams for welding.

4. The method according to claim 1, wherein said axes of said laser beam for welding and said light beam for positioning are moved in unison with each other with respect to the axis of the electron gun.

5. The method according to claim 1, wherein said light beam for positioning is a laser beam.

6. The method according to claim 1, wherein the portion of the electrode to be welded corresponding to the welding point is an edge portion of a peripheral edge surface of the electrode.

7. An apparatus for welding a strap conductor to an electrode of an electron gun, comprising:

a laser beam generator for producing a laser beam for effecting the welding of electron gun parts including said electrode and strap conductor to be welded together, a positioning light source for producing light for positioning a welding point, a light-sensing means for (a) detecting reflected light obtained when said light for positioning is reflected by an edge of said electrode which corresponds to said welding point but differs from the welding point and (b) generating a position signal in response to the detection, the light sensing means including a lens for focusing light reflected from the electrode, a pin-hole aperture positioned at the focus of the lens for blocking light reflected from the electrode other than from the edge and an optical sensor for detecting light passing through the pinhole, whereby only light reflected from the edge is detected by the sensor, a means for causing relative movement of the optical axes of said laser beam and positioning light source, said axes having a fixed predetermined positional relation to each other, with respect to the electrodes and strap conductor, and a means for controlling the operation of said moving means according to said positioning signal generated by said light-sensing means.

* * * * *